United States Patent [19]
Shioji et al.

[11] Patent Number: 5,223,962
[45] Date of Patent: Jun. 29, 1993

[54] LIQUID-CRYSTAL COLOR DISPLAY WITH PARALLELOGRAM-SHAPED PIXELS

[75] Inventors: Mitsuaki Shioji, Nara; Kunihiko Ito, Yamatokoriyama; Hiroshi Fukutani; Kazuhiko Akimoto, both of Nara, all of Japan

[73] Assignee: Sharp Kabushiki Kaisha, Osaka, Japan

[21] Appl. No.: 788,482

[22] Filed: Nov. 6, 1991

[30] Foreign Application Priority Data

Nov. 9, 1990 [JP] Japan .................. 2-305011

[51] Int. Cl.$^5$ ............................ G02F 1/1335
[52] U.S. Cl. ............................ 359/67; 359/68
[58] Field of Search ........................ 359/67, 68

[56] References Cited

U.S. PATENT DOCUMENTS 4,811,003  3/1989  Strathman et al. .................. 359/68
4,986,637  1/1991  Yamaguchi .......................... 359/54
5,146,356  9/1992  Carlson ............................. 359/87

Primary Examiner—William L. Sikes
Assistant Examiner—Anita Pellman Gross
Attorney, Agent, or Firm—David G. Conlin; Robert F. O'Connell

[57] ABSTRACT

Disclosed is a liquid-crystal color display having a pair of light-transmitting substrates disposed opposite each other sandwiching a liquid crystal layer between them and color selecting members and a light blocking member provided on one of the pair of light-transmitting substrates, wherein the shape of each pixel defined by the color selecting members and the light blocking member is a parallelogram with all four angles other than 90°. Accordingly, the liquid-crystal color display of the invention is capable of displaying sloping letters such as italics and other sloping patterns as naturally sloping patterns easy to recognize.

8 Claims, 3 Drawing Sheets

3 STRIPE MASK
2 COLOR FILTER
1 TRANSPARENT CONDUCTIVE FILM

43 STRIPE MASK
42 COLOR FILTER
41 TRANSPARENT CONDUCTIVE FILM

LIQUID-CRYSTAL COLOR DISPLAY WITH PARALLELOGRAM-SHAPED PIXELS

BACKGROUND OF THE INVENTION

1. Field of the Invention

The present invention relates to a liquid-crystal color display.

2. Description of the Prior Art

Generally, in a liquid-crystal color display, color filters and a stripe mask are provided on an SEG-side substrate on which SEG-side transparent electrodes patterned from a transparent conductive film are formed. A COM-side substrate, on which COM-side electrodes patterned from a conductive film are formed, is attached to the SEG-side substrate with a liquid crystal layer sandwiched between them, thus fabricating the liquid-crystal color display. In some liquid-crystal color displays, color filters and stripe masks are formed on the COM-side substrate.

As shown in FIG. 5, in a conventional liquid-crystal color display, color filters 42 disposed in pixel areas not covered by a strip mask 43, a light blocking member, are rectangular in shape with all four angles right angles. A desired pattern is displayed by activating pixel areas facing a transparent conductive film 41 and not activating pixel areas that do not face the transparent conductive film 41.

However, in the above prior art liquid-crystal color display, since the corners of each pixel area are right angles, display of a pattern of a so-called italic letter which is a sloping letter has been achieved either by changing the italic letter to a non-sloping letter as shown by arrow A in FIG. 4 or by approximating the constantly sloping lines of the letter by step-like jagged lines. As a result, an italic letter which should be displayed as a sloping letter has been unable to be displayed as a sloping letter at all, or if it can be displayed at all, appreciable bends are formed in the lines forming the italic letter, making the display pattern of the italic letter unnatural and therefore difficult to recognize.

SUMMARY OF THE INVENTION

It is accordingly an object of the invention to provide a liquid-crystal color display capable of displaying sloping letters such as italic letters as naturally sloping patterns easy to recognize.

To accomplish the above object, the invention provides a liquid-crystal color display comprising: a plurality of color selecting members provided for transmitting light of specific colors respectively and formed over one entire surface of one of a pair of light-transmitting substrates disposed opposite each other sandwiching a liquid crystal layer between them, the one entire surface being on the side facing the liquid crystal layer; a light blocking member interposed between the adjacent color selecting members; and a pair of transparent conductive films which are respectively provided in the display areas on the sides facing the liquid crystal layer of the pair of light-transmitting substrates and which, in response to electrical signals, alter the molecular alignment in the liquid crystal layer in the portion thereof facing the specific color selecting member selected in accordance with the color to be displayed in the display area, the liquid-crystal color display being characterized in that the shape of each pixel defined by the color selecting members and the light blocking member is a parallelogram with all four angles other than 90°.

In a preferred embodiment, the color selecting members are color filters of different colors, formed in an equispaced stripe pattern and arranged in a prescribed order, and the light blocking member is a mask formed in a stripe pattern interposing between the adjacent color filters, the mask pitch being equal to the color filter pitch and the sloping angle of the mask being equal to that of the color filters.

In another preferred embodiment, the color selecting members are color filters of different colors, formed in an equispaced stripe pattern and arranged in a prescribed order, and the light blocking member is a lattice-shaped mask formed from a mask formed in a stripe pattern interposing between the color filters and a mask formed with a prescribed pitch and having the same width as that of the stripe-patterned mask.

According to the above construction, since the shape of each pixel defined by the color selecting members and the light blocking member is a parallelogram with all four angles other than 90°, sloping letters such as italics and other display patterns that should be displayed as sloping patterns are displayed as naturally sloping patterns easy to recognize.

In one preferred embodiment, the color selecting members are color filters of different colors, formed in an equispaced stripe pattern and arranged in a prescribed order, and the light blocking member is a mask formed in a stripe pattern interposing between the adjacent color filters, the mask pitch being equal to the color filter pitch and the sloping angle of the mask being equal to that of the color filters. In this case, a complicated pattern formed with portions having a constant sloping angle is displayed as an easy-to-recognize naturally sloping pattern by using a plurality of pixels defined by the color filters and the mask and having a constant sloping angle.

In another preferred embodiment, the color selecting members are color filters of different colors, formed in an equispaced stripe pattern and arranged in a prescribed order, and the light blocking member is a lattice-shaped mask formed from a mask formed in a stripe pattern interposing between the color filters and a mask formed with a prescribed pitch and having the same width as that of the stripe-patterned mask. In this case, a complicated pattern formed with portions having a constant sloping angle is displayed as an easy-to-recognize naturally sloping pattern by using a plurality of pixels defined by the color filters and the lattice-shaped mask and having a constant sloping angle.

As is apparent from the above description, in the liquid-crystal color display of the invention, since the shape of each pixel defined by the color selecting members and the light blocking member is a parallelogram with all four angles other than 90°, sloping letters such as italics and other display patterns that should be displayed as sloping patterns can be displayed as naturally sloping patterns easy to recognize.

In one preferred embodiment, the color selecting members are color filters of different colors, formed in an equispaced stripe pattern and arranged in a prescribed order, and the light blocking member is a mask formed in a stripe pattern interposing between the adjacent color filters, the mask pitch being equal to the color filter pitch and the sloping angle of the mask being equal to that of the color filters. In this case, a complicated pattern formed with portions having a constant sloping angle can be displayed as an easy-to-recognize naturally sloping pattern by using a plurality of pixels defined by the color filters and the mask and having a constant sloping angle.

In another preferred embodiment, the color selecting members are color filters of different colors, formed in an equispaced stripe pattern and arranged in a prescribed order, and the light blocking member is a lattice-shaped mask formed from a mask formed in a stripe pattern interposing between the color filters and a mask formed with a prescribed pitch and having the same width as that of the stripe-patterned mask. In this case, a complicated pattern formed with portions having a constant sloping angle can be displayed as an easy-to-recognize naturally sloping pattern by using a plurality of pixels defined by the color filters and the lattice-shaped mask and having a constant sloping angle.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
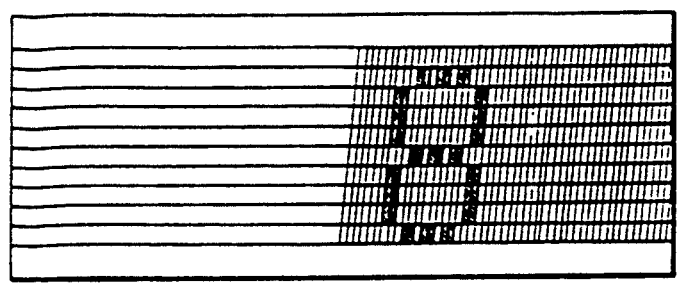
FIG. 1 is a diagram showing an italic letter displayed on a liquid-crystal color display in one embodiment of the invention.

Now referring to the drawing, preferred embodiments of the invention are described below.

Figure 2:
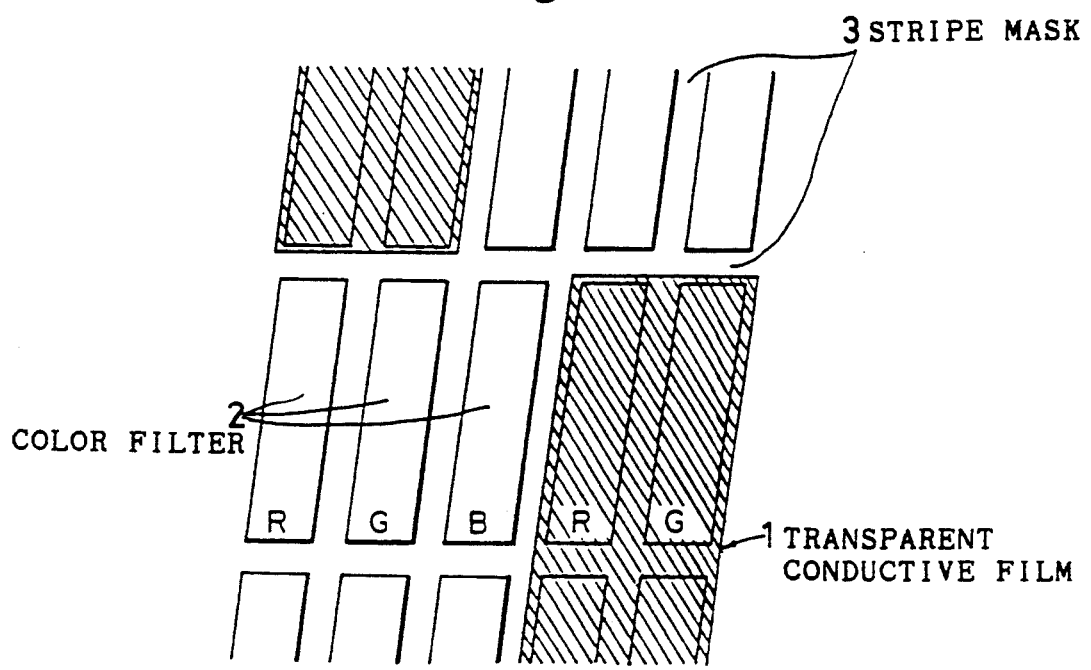
FIG. 2 is a diagram showing an essential portion of the above embodiment.
Figure 3:
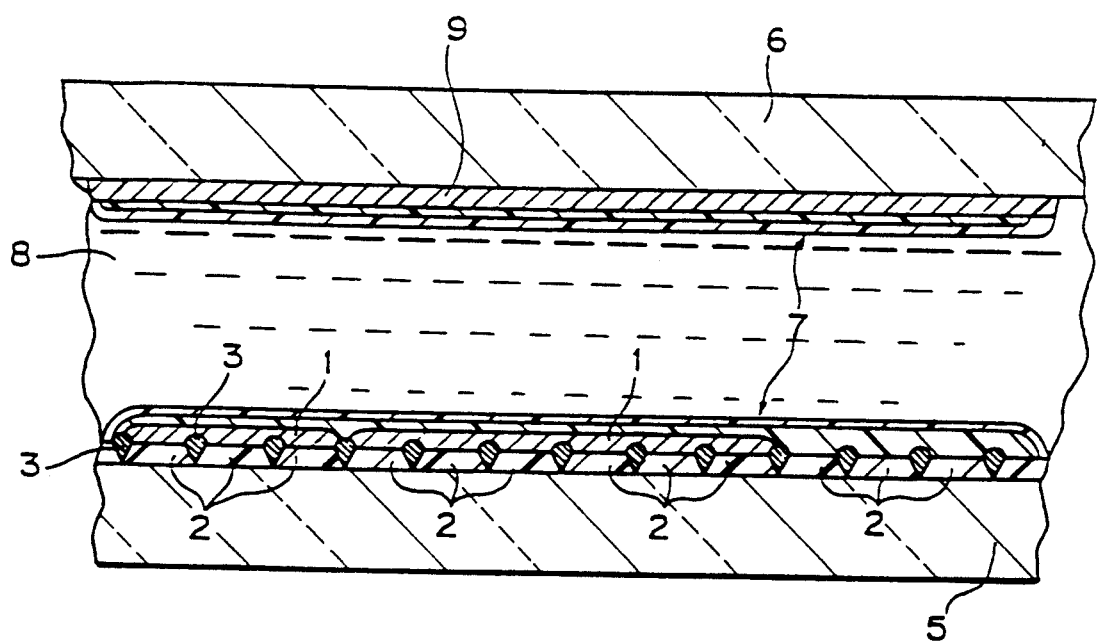
FIG. 3 is a cross sectional view of the above embodiment.
Figure 4:
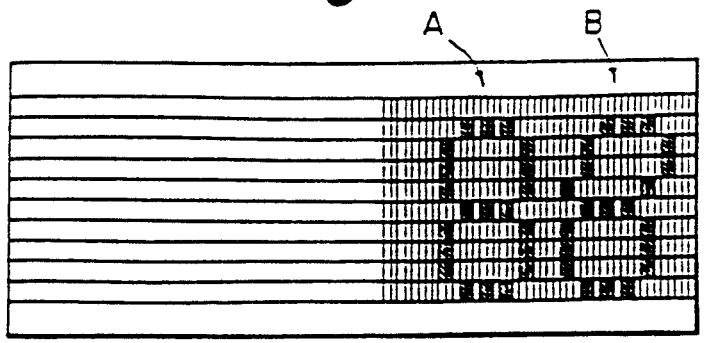
FIG. 4 is a diagram showing italic letters displayed on a prior art liquid-crystal color display.
Figure 5:
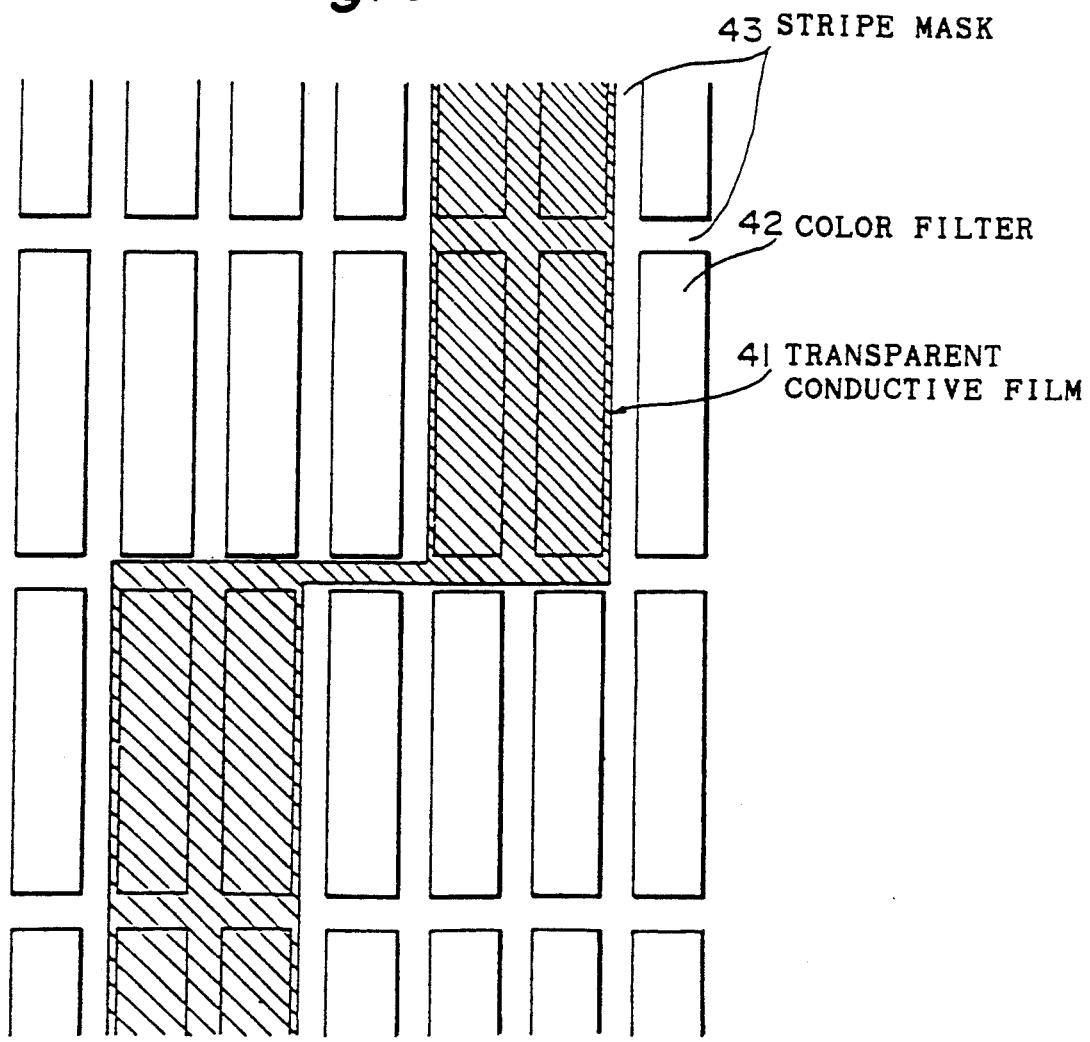
FIG. 5 is a diagram showing an essential portion of the prior art liquid-crystal color display.

FIG. 2 is a diagram showing an essential portion of a liquid-crystal color display in one embodiment of the invention. This embodiment includes: red, green, and blue color filters 2, serving as color selecting members, formed in an equispaced stripe pattern and arranged in a prescribed order; a lattice-shaped stripe mask 3 serving as a light blocking member; and a transparent conductive film 1. As shown in FIG. 3, two light-transmitting substrates, one on the SEG side 5 and the other on the COM-side 6, are disposed opposite each other sandwiching a liquid crystal layer 8 between them. The color filters 2 are disposed over one entire surface of the SEG-side light-transmitting substrate, the entire surface being on the side facing the liquid crystal layer 8. Orientation films 7 are provided to determine the initial orientation of molecules in the liquid crystal layer 8. The color filters 2 are inclined at an angle of 5° with respect to the perpendicular vertical axis. The transparent conductive film 1 forms SEG-side transparent electrodes which are provided on the side facing the liquid crystal layer 8 of the SEG-side light-transmitting substrate 5. The transparent conductive film 1 is formed opposite to a COM-side transparent electrode 9 formed on the COM-side light-transmitting substrate 6. The stripe mask 3 is inclined at an angle of 5° with respect to the perpendicular vertical axis and consists of stripe-patterned portions interposed between the adjacent color filters 2 and portions formed in parallel to the horizontal axis and having the same width as the stripe-patterned portions. Therefore, the shape of each opening in the lattice-shaped stripe mask 3 is a parallelogram with all four angles oblique by 5° with respect to 90°. Also, the color filters 2 and the transparent conductive film 1 are inclined at an angle of 5° to match the shape of the openings. Each opening functions as a pixel.

In the thus constructed liquid-crystal color display, varying voltages are applied to the transparent conductive film 1, i.e. the SEG-side transparent electrodes, and to the COM-side transparent electrode 9 so that the molecular alignment in the liquid crystal layer 8 is altered. This activates a plurality of pixels facing the transparent conductive film 1, thus allowing an italic letter, a sloping letter, to be displayed as a naturally sloping pattern easy to recognize as shown in FIG. 1.

In the above embodiment, the openings in the stripe mask 5, the color filters 2, and the transparent conductive film 1 are inclined at an angle of 5° (sloping angle), but this sloping angle may be set at any angle within the range of 3° to 15° according to the desired shape of italics to be displayed. Also, in the above embodiment, the stripe mask 3 and the transparent conductive film 1 are stacked on top of the color filters 2, but the transparent conductive film 1, the color filters 2, and the stripe mask 3 may be stacked in any order. Further, when displaying a plurality of patterns, other than italics or other sloping letters, arranged in series and inclined at a constant angle, the sloping angle may be set at a value that matches the patterns, so that the patterns can be displayed as easy-to-recognize naturally sloping patterns without impairing the pattern image.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A liquid-crystal color display comprising:
   a plurality of color selecting members provided for transmitting light of specific colors respectively and formed over one entire surface of one of a pair of light-transmitting substrates disposed opposite each other sandwiching a liquid crystal layer between them, the one entire surface being on the side facing the liquid crystal layer;
   a light blocking member interposed between the adjacent color selecting members; and
   a pair of transparent conductive films which are respectively provided in the display areas on the sides facing the liquid crystal layer of the pair of light-transmitting substrates and which, in response to electrical signals, alter the molecular alignment in the liquid crystal layer in the portion thereof facing the specific color selecting member selected in accordance with the color to be displayed in the display area,
   the liquid-crystal color display being characterized in that the shape of each pixel defined by the color selecting members and the light blocking member is a parallelogram with all four angles other than 90° and in which all pixels incline at the same angle.

2. A liquid-crystal color display as set forth in claim 1, wherein: the pair of light-transmitting substrates disposed opposite each other with the liquid crystal layer sandwiched between them are provided with segment side and common side transparent electrodes respectively, the color selecting members and the light blocking member being provided on the substrate on which the segment side transparent electrodes are formed.

3. A liquid-crystal color display as set forth in claim 1, wherein: the pair of light-transmitting substrates disposed opposite each other with the liquid crystal layer sandwiched between them are provided with segment side and common side transparent electrodes respectively, the color selecting members and the light blocking member being provided on the substrate on which the common side transparent electrodes are formed.

4. A liquid-crystal color display as set forth in claim 1, wherein: the color selecting members are color filters of different colors, formed in an equispaced stripe pattern and arranged in a prescribed order; and the light blocking member is a mask formed in a stripe pattern interposing between the adjacent color filters, the mask pitch being equal to the color filter pitch and the sloping angle of the mask being equal to that of the color filters.

5. A liquid-crystal color display as set forth in claim 1, wherein: the color selecting members are color filters of different colors, formed in an equispaced stripe pattern and arranged in a prescribed order; and the light blocking member is an oblique lattice-shaped mask formed from a mask formed in a stripe pattern interposing between the color filters and a mask formed with a prescribed pitch and having the same width as that of the stripe-patterned mask.

6. A liquid-crystal color display as set forth in claim 1, wherein: the color selecting members are color filters of three colors, red, green, and blue.

7. A liquid-crystal color display as set forth in claim 1, wherein: the shape of each pixel defined by the color selecting members and the light blocking member is a parallelogram with all four angles oblique by 3° to 15° with respect to 90°.

8. A liquid-crystal color display as set forth in claim 7, wherein: the shape of each pixel defined by the color selecting members and the light blocking member is a parallelogram with all four angles oblique by 5° with respect to 90°.

* * * * *